US010688625B2

(12) United States Patent
Meuler et al.

(10) Patent No.: US 10,688,625 B2
(45) Date of Patent: Jun. 23, 2020

(54) ABRASIVE ARTICLE (71) Applicant: 3M INNOVATIVE PROPERTIES COMPANY, St. Paul, MN (US)

(72) Inventors: Adam J. Meuler, Woodbury, MN (US); Daniel J. Schmidt, Woodbury, MN (US); Yugeun P. Yang, St. Paul, MN (US); Paul D. Graham, Woodbury, MN (US); David A. Nettleship, Atherstone (GB); Philip S. Hill, Coalville (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/066,493

(22) PCT Filed: Dec. 29, 2016

(86) PCT No.: PCT/US2016/069127
§ 371 (c)(1),
(2) Date: Jun. 27, 2018

(87) PCT Pub. No.: WO2017/117356
PCT Pub. Date: Jul. 6, 2017

(65) Prior Publication Data
US 2019/0001467 A1  Jan. 3, 2019

Related U.S. Application Data (60) Provisional application No. 62/273,024, filed on Dec. 30, 2015.

(51) Int. Cl.
*B24B 1/00* (2006.01)
*B24D 3/00* (2006.01)
(Continued)

(52) U.S. Cl.
CPC ............ *B24D 11/001* (2013.01); *B24D 3/004* (2013.01); *B24D 3/14* (2013.01); *B24D 3/346* (2013.01);
(Continued)

(58) Field of Classification Search
USPC .......................................... 51/293, 307, 309
See application file for complete search history.

(56) References Cited

U.S. PATENT DOCUMENTS 3,619,150 A  11/1971  Royden
3,922,464 A  11/1975  Silver
(Continued)

FOREIGN PATENT DOCUMENTS

CN  106118422 A  * 11/2016
DE  3516661  11/1985
(Continued)

OTHER PUBLICATIONS

Decker, "Kinetic study and new applications of UV radiation curing", Macromolecular rapid communications, 2002, vol. 23, pp. 1067-1093.
(Continued)

*Primary Examiner* — James E McDonough (57) ABSTRACT

An abrasive article is provided which comprises a plurality of layers in the following order: a backing; an abrasive layer; a primer layer comprising clay particles, wherein the clay particles are agglomerated and form a layer; and a supersize coat comprising a metal salt of a long-chain fatty acid. The addition of the aforementioned primer layer can significantly reduce loading of swarf and improve both the cut and expected lifetime of the abrasive article.

12 Claims, 2 Drawing Sheets

(51) Int. Cl.
- B24D 11/00 (2006.01)
- B24D 3/34 (2006.01)
- B24D 3/14 (2006.01)
- B24D 11/02 (2006.01)
- B24D 3/02 (2006.01)
- B24D 18/00 (2006.01)
- C09K 3/14 (2006.01)
- B32B 3/30 (2006.01)
- B32B 27/06 (2006.01)
- B32B 27/18 (2006.01)

(52) U.S. Cl.
CPC .............. *B24D 11/02* (2013.01); *B32B 3/30* (2013.01); *B32B 27/06* (2013.01); *B32B 27/18* (2013.01); *B32B 2250/04* (2013.01); *B32B 2255/04* (2013.01); *B32B 2260/025* (2013.01); *B32B 2260/046* (2013.01); *B32B 2264/107* (2013.01); *B32B 2475/00* (2013.01)

(56) References Cited

U.S. PATENT DOCUMENTS

| | | | |
|---|---|---|---|
| 4,642,126 A | 2/1987 | Zador | |
| 4,645,711 A | 2/1987 | Winslow | |
| 4,652,274 A | 3/1987 | Boettcher | |
| 4,737,593 A | 4/1988 | Ellrich | |
| 4,988,554 A | 1/1991 | Peterson | |
| 5,037,453 A | 8/1991 | Narayanan | |
| 5,108,463 A | 4/1992 | Buchanan | |
| 5,116,676 A | 5/1992 | Winslow | |
| 5,342,419 A | 8/1994 | Hibbard | |
| 5,549,962 A * | 8/1996 | Holmes | B24D 3/28 428/143 |
| 5,628,952 A | 5/1997 | Holmes | |
| 5,648,425 A | 7/1997 | Everaerts | |
| 5,663,241 A | 9/1997 | Takamatsu | |
| 5,700,302 A | 12/1997 | Stoetzel | |
| 5,702,811 A | 12/1997 | Ho | |
| 5,704,952 A | 1/1998 | Law | |
| 5,721,289 A | 2/1998 | Karim | |
| 5,804,610 A | 9/1998 | Hamer | |
| 5,833,724 A | 11/1998 | Wei | |
| 5,914,299 A | 6/1999 | Harmer | |
| 6,057,382 A | 5/2000 | Karim | |
| 6,083,290 A | 7/2000 | Ikeda | |
| 6,153,302 A | 11/2000 | Karim | |
| 6,183,677 B1 | 2/2001 | Usui | |
| 6,187,836 B1 | 2/2001 | Oxman | |
| 6,254,954 B1 | 7/2001 | Bennett | |
| 6,354,929 B1 | 3/2002 | Adefris | |
| 6,359,027 B1 * | 3/2002 | Dahlke | B24D 18/00 522/153 |
| 6,372,323 B1 | 4/2002 | Kobe | |
| 6,682,574 B2 | 1/2004 | Carter | |
| 6,773,474 B2 | 8/2004 | Koehnle | |
| 6,835,220 B2 | 12/2004 | Swei | |
| 7,329,175 B2 | 2/2008 | Woo | |
| 7,713,604 B2 | 5/2010 | Yang | |
| 8,506,752 B2 | 8/2013 | Vandal | |
| 2002/0182955 A1 | 12/2002 | Weglewski | |
| 2003/0114078 A1 | 6/2003 | Mann | |
| 2009/0155596 A1 | 6/2009 | Kropp | |
| 2010/0022170 A1 | 1/2010 | Starling | |
| 2011/0256813 A1 * | 10/2011 | Fletcher | B24B 37/28 451/59 |
| 2013/0219800 A1 | 8/2013 | Guiselin | |
| 2014/0113131 A1 | 4/2014 | Yamamoto | |
| 2014/0120344 A1 | 5/2014 | Yamamoto | |
| 2015/0030839 A1 | 1/2015 | Satrijo | |

FOREIGN PATENT DOCUMENTS

| | | |
|---|---|---|
| EP | 2679332 | 1/2014 |
| EP | 2722376 | 4/2014 |
| EP | 3012288 | 4/2016 |
| EP | 2868692 | 10/2017 |
| GB | 2492304 | 12/2012 |
| JP | S5127482 | 10/1980 |
| JP | 2000008025 | 1/2000 |
| WO | WO 1994-029399 | 12/1994 |
| WO | WO 1996-021704 | 7/1996 |
| WO | WO 2009-059900 | 5/2009 |
| WO | WO 2014-172139 | 10/2014 |
| WO | WO 2014-172332 | 10/2014 |
| WO | WO 2016-035170 | 3/2016 |
| WO | WO 2016-073227 | 5/2016 |
| WO | WO 2016-085791 | 6/2016 |
| WO | WO 2016-195970 | 12/2016 |
| WO | WO 2016-196561 | 12/2016 |
| WO | WO 2017-116941 | 7/2017 |
| WO | WO 2017-117163 | 7/2017 |
| WO | WO 2017-117364 | 7/2017 |

OTHER PUBLICATIONS

Mark, "Encyclopedia of Polymer Science and Technology", Wiley-interscience publication, 1986, vol. 6, pp. 322-380.

International Search report for PCT International Application No. PCT/US2016/069127 dated May 10, 2017, 5 pages.

* cited by examiner

ABRASIVE ARTICLE

CROSS REFERENCE TO RELATED APPLICATIONS

This application is a national stage filing under 35 U.S.C. 371 of PCT/US2016/069127, filed Dec. 29, 2016, which claims the benefit of U.S. Application No. 62/273,024, filed Dec. 30, 2015, the disclosure of which is incorporated by reference in its/their entirety herein.

FIELD OF THE INVENTION

Provided are abrasive articles and related methods. The abrasive articles include those useful in, for example, abrading soft materials such as painted automotive surfaces.

BACKGROUND

Modern abrasives articles have become engineered to perform abrading operations on a broad range of industrial and commercial applications. Such applications can include the finishing of structural materials such as plastic, wood and metal, opthalmic lenses, fiber optics, and semiconductor materials such as silicon.

Most commonly, abrasive articles are made from a plurality of abrasive particles affixed to some sort of backing, which can be either rigid or flexible. In some cases, the abrasive particles are uniformly mixed with a polymeric binder to form a slurry, which is then coated onto the backing and cured to provide the final product. In other cases, the abrasive particles are aligned in a one or more layers over the backing and adhered to the backing by layers of curable resin known as a "make" coat and "size" coat. An advantage of the latter approach is that the abrasive particles can be partially embedded in the make and size coats in a preferred orientation that provides for an efficient rate of material removal, or cut.

A problem often encountered with these abrasive products is difficulty in abrading surfaces that are soft and difficult to finish. The performance of abrasive products on these materials tends to diminish as swarf particles coalesce and fill the spaces between the abrasive grains. The loading of this swarf prevents the abrasive from effectively contacting the work surface and reduces the cut. Empirically, it was discovered that this problem can be mitigated significantly by applying a "supersize" coat of a metal soap such as calcium stearate or zinc stearate on top of the abrasive particles. Advantageously, this supersize coat reduces loading of swarf and improves both the cut and lifetime of the abrasive product.

SUMMARY

Notwithstanding the performance improvement enabled by the supersize coat, loading remains a persistent problem for end users of these abrasive articles. It was discovered that the addition of clay particles between the supersize coat and the size coat/abrasive particles can significantly reduce the degree of loading even further than the supersize coat alone. Clay can decrease friction between the abrasive and the work surface and also dissipate static charge, which is believed to cause localized aggregation of swarf particles at the interface where the abrasive article contacts the work surface. As a result, abrasive articles that incorporate a primer layer of clay particles can display significantly improved cut performance.

In a first aspect, an abrasive article is provided. The abrasive article comprises a plurality of layers in the following order: a backing; an abrasive layer; a primer layer comprising clay particles, wherein the clay particles are agglomerated and form a layer; and a supersize coat comprising a metal salt of a long-chain fatty acid.

In a second aspect, a method of making an abrasive article is provided, comprising: dispersing clay particles in a first solvent to provide a first dispersion; coating the first dispersion onto an abrasive layer; drying the first dispersion to obtain a primer layer; dispersing a metal salt of a long-chain fatty acid, and optionally a polymeric binder, in a second solvent to provide a second dispersion; coating the second dispersion onto the primer layer; and drying the second dispersion to obtain the abrasive article.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:

"particle aspect ratio" refers to the ratio between the longest and the shortest dimension of the particle; and "particle diameter" refers to the longest dimension of the particle.

DETAILED DESCRIPTION

Figure 1:
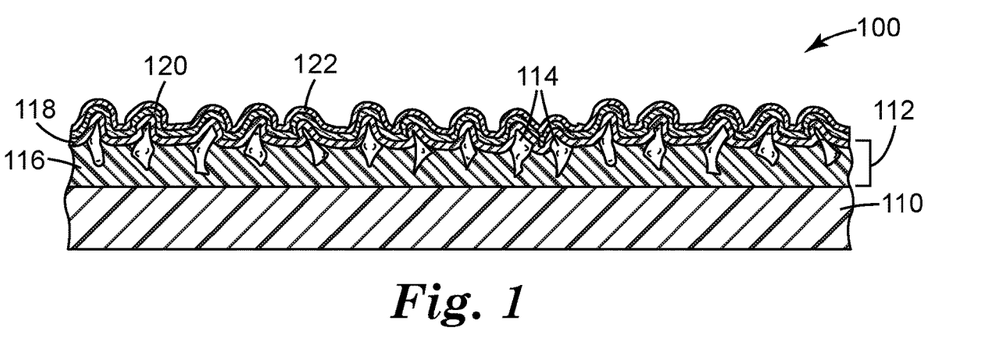
FIGS. 1-5 are a side cross-sectional views of abrasive articles according to various exemplary embodiments.

An exemplary abrasive article is illustrated according to one embodiment in FIG. 1 and herein referred to by the numeral 100. In this depiction, the abrasive article 100 includes a plurality of layers. These layers include, from the bottom to the top, a backing 110, an abrasive layer 112, a primer layer 120, and a supersize coat 122. As further shown, the abrasive layer 112 itself has a multilayered construction and includes a make coat 116, abrasive particles 114, and a size coat 118. Each will be discussed in turn.

The bottom layer of the abrasive article 100 is the backing 110. The backing 110 may be constructed from any of a number of materials known in the art for making coated abrasive articles. Although not necessarily so limited, the backing 110 can have a thickness of at least 0.02 millimeters, at least 0.03 millimeters, 0.05 millimeters, 0.07 millimeters, or 0.1 millimeters. The backing 110 could have a thickness of up to 5 millimeters, up to 4 millimeters, up to 2.5 millimeters, up to 1.5 millimeters, or up to 0.4 millimeters.

The backing 110 is preferably flexible and may be either solid (as shown in FIG. 1) or porous. Flexible backing materials include polymeric film (including primed films) such as polyolefin film (e.g., polypropylene including biaxially oriented polypropylene, polyester film, polyamide film, cellulose ester film), polyurethane rubber, metal foil, mesh, foam (e.g., natural sponge material or polyurethane foam), cloth (e.g., cloth made from fibers or yarns comprising polyester, nylon, silk, cotton, and/or rayon), scrim, paper, coated paper, vulcanized paper, vulcanized fiber, nonwoven materials, combinations thereof, and treated versions thereof. The backing may also be a laminate of two materials (e.g., paper/film, cloth/paper, or film/cloth). Cloth backings may be woven or stitch bonded. In some embodiments, the backing is a thin and conformable polymeric film capable of expanding and contracting in transverse (i.e. in-plane) directions during use.

Preferably, a strip of such a backing material that is 5.1 centimeters (2 inches) wide, 30.5 centimeters (12 inches) long, and 0.102 millimeters (4 mils) thick and subjected to a 22.2 Newton (5 pounds-force) dead load longitudinally stretches at least 0.1%, at least 0.5%, at least 1.0%, at least 1.5%, at least 2.0%. at least 2.5%, at least 3.0%, or at least 5.0%, relative to the original length of the strip. Preferably, the backing strip longitudinally stretches up to 20%, up to 18%, up to 16%, up to 14%, up to 13%, up to 12%, up to 11%, or up to 10%, relative to the original length of the strip. The stretching of the backing material can be elastomeric (with complete spring back), inelastic (with zero spring back), or some mixture of both. This property helps promote contact between the abrasive particles 114 and the underlying substrate, and can be especially beneficial when the substrate includes raised and/or recessed areas.

Useful backing materials are generally conformable. Highly conformable polymers that may be used in the backing 110 include certain polyolefin copolymers, polyurethanes, and polyvinyl chloride. One particularly preferred polyolefin copolymer is an ethylene-acrylic acid resin (available under the trade designation "PRIMACOR 3440" from Dow Chemical Company, Midland, Mich.). Optionally, ethylene-acrylic acid resin is one layer of a bilayer film in which the other layer is a polyethylene terephthalate ("PET") carrier film. In this embodiment, the PET film is not part of the backing 110 itself and is stripped off prior to using the abrasive article 100. Alternatively, the PET film could be bonded with the ethylene-acrylic acid resin, with the two layers staying together during use of the abrasive article.

In some embodiments, the backing 110 has a modulus of at least 10, at least 12, or at least 15 kilogram-force per square centimeter ($kgf/cm^2$). In some embodiments, the backing 110 has a modulus of up to 200, up to 100, or up to 30 $kgf/cm^2$. The backing 110 can have a tensile strength at 100% elongation (double its original length) of at least 200 $kgf/cm^2$, at least 300 $kgf/cm^2$, or at least 350 $kgf/cm^2$. The tensile strength of the backing 110 can be up to 900 $kgf/cm^2$, up to 700 $kgf/cm^2$, or up to 550 $kgf/cm^2$. Backings with these properties can provide various options and advantages, further described in U.S. Pat. No. 6,183,677 (Usui et al.).

Optionally, the backing may have at least one of a saturant, a presize layer and/or a backsize layer. The purpose of these materials is typically to seal the backing and/or to protect yarn or fibers in the backing. If the backing is a cloth material, at least one of these materials is typically used. The addition of the presize layer or backsize layer may additionally result in a smoother surface on either the front and/or the back side of the backing. Other optional layers known in the art may also be used, as described in U.S. Pat. No. 5,700,302 (Stoetzel et al.).

Optionally and as shown in FIG. 1, the abrasive layer 112 is a coated abrasive film that includes a plurality of abrasive particles 114 secured to a plurality of hardened resin layers. Here, the abrasive particles 114 are adhesively coupled to the backing 110 by implementing a sequence of coating operations involving a hardenable make coat 116 and size coat 118. Advantageously, the abrasive particles 114 are partially or fully embedded in respective make and size coats 116, 118, while located at or sufficiently close to the surface of the abrasive article 100 such that the abrasive particles 114 can easily come into frictional contact with the substrate when the abrasive article 100 is rubbed against the substrate.

The abrasive particles 114 are not limited and may be composed of any of a wide variety of hard minerals known in the art. Examples of suitable abrasive particles include, for example, fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles, silica, iron oxide, chromia, ceria, zirconia, titania, tin oxide, gamma alumina, and combinations thereof. The alumina abrasive particles may contain a metal oxide modifier. The diamond and cubic boron nitride abrasive particles may be monocrystalline or polycrystalline.

There is almost always a significant range or distribution of abrasive particle sizes. Such a distribution can nonetheless be characterized by a median particle size. For instance, the number median particle size of the abrasive particles may range from between 0.001 and 300 micrometers, between 0.01 and 250 micrometers, or between 0.02 and 100 micrometers.

Referring again to FIG. 1, the next layer shown extending over and contacting the abrasive layer 112 is the primer layer 120. The primer layer 120 is comprised of clay particles. The clay particles are agglomerated and form a discrete, continuous layer. A discontinuous layer may also be used in some cases. The primer layer, in some embodiments, has a coating weight of at least 0.01 $g/m^3$, at least 0.015 $g/m^3$, or at least 0.02 $g/m^3$. The coating weight can be up to 10 $g/m^3$, up to 5 $g/m^3$, or up to 2 $g/m^3$.

The individual clay particles can have particle sizes that vary over a very wide range. For example, the median particle size can be at least 0.01 micrometers, at least 0.02 micrometers, or at least 0.1 micrometers. The individual clay particles can have a median particle size of up to 100 micrometers, up to 10 micrometers, or up to 1 micrometer.

The unique physical properties of many useful clay materials relate to their layered platelet-like structures. Such particles can have a median aspect ratio of at least 10, at least 15, at least 20, at least 50, at least 75, or at least 100. Further, the median aspect ratio can be up to 10,000, up to 8000, up to 6000, up to 4000, up to 2000, or up to 1000.

The clay particles may include particles of any known clay material. Such clay materials include those in the geological classes of the smectites, kaolins, illites, chlorites, serpentines, attapulgites, palygorskites, vermiculites, glauconites, sepiolites, and mixed layer clays. Smectites in particular include montmorillonite (e.g., sodium montmorillonite), bentonite, pyrophyllite, hectorite, saponite, sauconite, nontronite, talc, beidellite, and volchonskoite. Specific kaolins include kaolinite, dickite, nacrite, antigorite, anauxite, halloysite, indellite and chrysotile. Illites include bravaisite, muscovite, paragonite, phlogopite and biotite. Chlorites can include, for example, corrensite, penninite, donbassite, sudoite, pennine and clinochlore. Mixed layer clays can include allevardite and vermiculitebiotite. Variants and isomorphic substitutions of these layered clays may also be used.

Layered clay materials may be either naturally occurring or synthetic. Exemplary clay materials include natural and synthetic hectorites, montmorillonites and bentonites. Examples of montmorillonite and bentonite clays include those clays available from Southern Clay Products, Gonzales, Tex., under the trade designations "CLOISITE", "MIN- ERAL COLLOID", "NANOFIL", "GELWHITE", and "OPTIGEL" (e.g., "MINERAL COLLOID BP", "CLOISITE NA+", "NANOFIL 116", and "OPTIGEL CK"), as well as those clays available from R. T. Vanderbilt, Murray, Ky., under the trade designation "VEEGUM" (e.g., "VEEGUM PRO" and "VEEGUM F"; and that clay available from Nanocor, Inc., Hoffman Estates, Ill., under the trade designation "NANOMER". Examples of hectorite clays include the commercially available clays available from Southern Clay Products, Inc., Gonzales, Tex., under the trade designation "LAPONITE".

Other clay particles may be composed of vermiculite clays, such as those commercially available from Specialty Vermiculite Corp., Enoree, S.C., under the trade designations "VERMICULITE", "MICROLITE", "VERXITE", and "ZONOLITE".

Natural clay minerals typically exist as layered silicate minerals. A layered silicate mineral has $SiO_4$ tetrahedral sheets arranged into a two-dimensional network structure. A 2:1 type layered silicate mineral has a laminated structure of several to several tens of silicate sheets having a three layered structure in which a magnesium octahedral sheet or an aluminum octahedral sheet is interposed between a pair of silica tetrahedral sheets.

Particular silicates include hydrous silicate, layered hydrous aluminum silicate, fluorosilicate, mica-montmorillonite, hydrotalcite, lithium magnesium silicate and lithium magnesium fluorosilicate. Substituted variants of lithium magnesium silicate are also possible, where the hydroxyl group is partially substituted with fluorine, for example. Lithium and magnesium may also be partially substituted by aluminum. More broadly, the lithium magnesium silicate may be isomorphically substituted by any member selected from the group consisting of magnesium, aluminum, lithium, iron, chromium, zinc and mixtures thereof.

Synthetic hectorite is commercially available from Southern Clay Products, Inc., under the trade designation "LAPONITE". There are many grades or variants and isomorphous substitutions of LAPONITE, including those synthetic hectorites available under the trade designations "LAPONITE B", "LAPONITE S", "LAPONITE XLS", "LAPONITE RD", "LAPONITE XLG", "LAPONITE S482", and "LAPONITE RDS".

Clay materials can provide particular frictional and static charge accumulation properties that can both impact swarf loading and abrasives performance. In the former case, the clay particles in the primer layer 120 can alleviate localized frictional heating known to increase swarf coalescence during an abrading operation. In the latter case, the clay particles can disrupt the electrostatic attraction that normally occurs between the abrasive article 100 and swarf particles.

As an optional additive, abrasive performance may be further enhanced by nanoparticles (i.e., nanoscale particles) interdispersed with the clay particles of the primer layer 120. Useful nanoparticles include, for example, nanoparticles of metal oxides, such as zirconia, titania, silica, ceria, alumina, iron oxide, vanadia, zinc oxide, antimony oxide, tin oxide, and alumina-silica. The nanoparticles can have a median particle size of at least 1 nanometer, at least 1.5 nanometers, or at least 2 nanometers. The median particle size can be up to 200 nanometers, up to 150 nanometers, up to 100 nanometers, up to 50 nanometers, or up to 30 nanometers.

The nanoparticles can have any of a number of different particle size distributions. In some embodiments, the silica nanoparticles have a $D_{90}/D_{50}$ particle size ratio of at least 1.1, at least 1.2, at least 1.3, or at least 1.4. In some embodiments, the silica nanoparticles have a $D_{90}/D_{50}$ particle size ratio of up to 5, up to 4, up to 3, up to 2, or up to 1.8.

In some embodiments, the nanoparticles are sintered to form nanoparticle agglomerates. For example, the nanoparticles may be comprised of fumed silica in which primary silica particles are sintered to provide silica particles aggregated into chains.

In one embodiment, the clay particles, and optionally any primer layer additives, can be readily dispersed in a solvent and the dispersion cast onto the abrasive layer 112 and subsequently dried to provide the primer layer 120. Useful clay materials can be hydrophilic, so water can be conveniently used to disperse the particles and additives. The top layer of the abrasive article 100 is the supersize coat 122, which extends over and contacts the primer layer 120. As the outermost coating, this layer directly contacts the workpiece during an abrading operation. Together, the supersize coat 122 and primer layer 120 act to reduce the loading of swarf around the abrasive particles 114 and improve the overall cut performance of the abrasive article 100.

Referring back to FIG. 1, the supersize coat 122 is disposed on the primer layer 120. The supersize coat 122 contains a metal salt of a long-chain fatty acid. In preferred embodiments, the metal salt of a long-chain fatty acid is a stearate (i.e., a salt of stearic acid). The conjugate base of stearic acid is $C_{17}H_{35}COO^-$, also known as the stearate anion. Useful stearates include calcium stearate, zinc stearate, and combinations thereof. The supersize coat 122 can be formed, in some embodiments, by providing a supersize dispersion that includes an epoxy resin, emulsifier for the epoxy resin, curing agent, and solvent, such as water. The composition may further include a polymeric binder, such as a carboxy-functional styrene-acrylic resin. Once mixed, the supersize dispersion can be coated onto the underlying layers of the abrasive article 100 and cured (i.e., hardened) either thermally or by exposure to actinic radiation at suitable wavelengths to activate the curing agent.

Any known method can be used to coat the dispersion above onto the primer layer 120. In exemplary embodiments, the dispersion is applied by a knife coating method where the coating thickness is controlled by the gap height of the knife coater. Alternatively, the composition could be applied by spray coating at a constant pressure to achieve a pre-determined coating weight.

Figure 2:
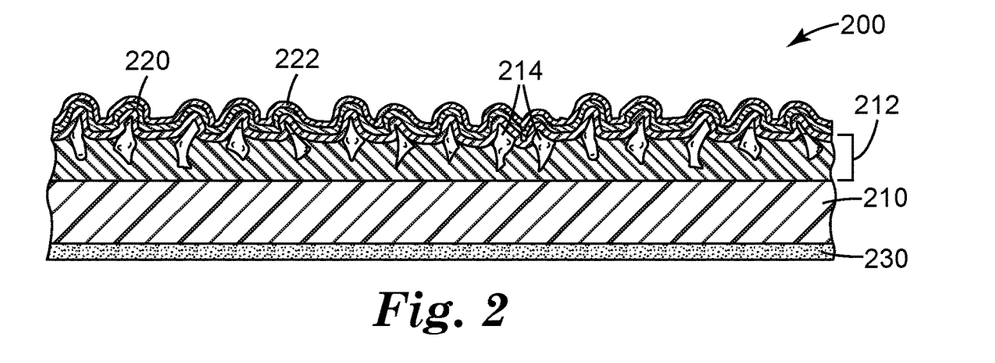
Figure 3:
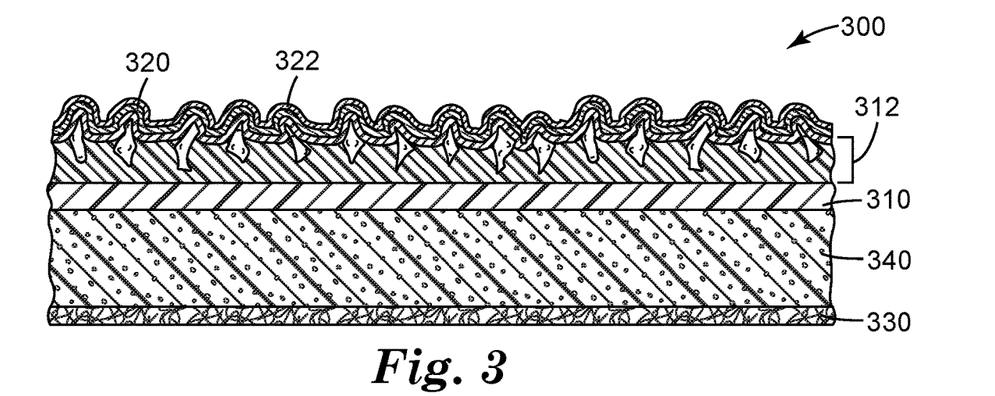
Figure 4:
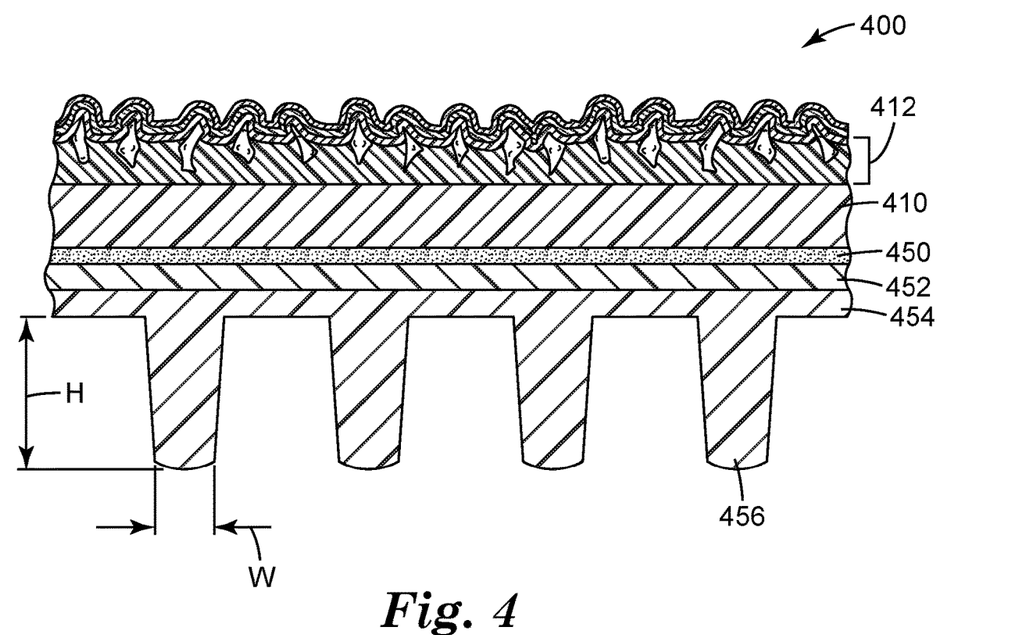

FIGS. 2-4 show various alternative constructions of the abrasive article 100, as described below.

FIG. 2, like FIG. 1, provides an abrasive article 200 having essentially the same features as abrasive article 100, including a backing 210, abrasive layer 212, primer layer 220, and supersize coat 222. The abrasive article 200 further includes, however, an attachment layer 230 disposed on the bottom surface of the backing 210. The particular attachment layer 230 shown in FIG. 2 is a pressure-sensitive adhesive used to secure the abrasive article 200 to a sanding block, power tool, or any other substrate that drives the abrasive article across the surface of the workpiece. Preferably, the pressure-sensitive adhesive is a removable adhesive, allowing for convenient replacement of the article 200 when needed.

FIG. 3 shows an abrasive article 300 having the general construction of abrasive article 200—an attachment layer 330, backing 310, abrasive layer 312, primer layer 320, and supersize coat 322—but further including a compressible foam 340 disposed between the backing 310 and the attachment layer 330. Advantageously, the compressible foam 340 can facilitate polishing a workpiece that has uneven surface contours. The attachment layer 330 shown is the loop part of a hook-and-loop attachment mechanism intended to mate with a complemental hook part disposed on a power tool, sanding block, or other substrate. In a further variant (not shown), the backing 310 is omitted entirely and the attachment layer 330 directly bonded to the abrasive layer 312. Each of the backing 310, foam 340, and attachment layer 330 could be either directly laminated to, or adhesively bonded to, its adjacent layer (or layers).

FIG. 4 presents yet another abrasive article 400 having the constituent layers of article 100 and further including an adhesive layer 450 bonding a backing 410 to an underlying reinforcing layer 452, which is in turn adhered to a gripping layer 454. The gripping layer 454 includes integral protrusions 456, each having a height H and width W, which assist the operator in handling the abrasive article 400. To provide improved handling of the abrasive article 400, it is beneficial for the gripping layer 454 to be made from an elastomeric polymer, and preferably elastomeric polymers having a Shore A hardness ranging from 5 to 90. Further information concerning useful materials and geometries for the gripping layer 454 are described in U.S. Pat. No. 6,372,323 (Kobe et al.) and co-pending International Patent Application No. PCT/US15/61762 (Graham et al.).

Other features of the abrasive articles 200, 300, and 400 are essentially analogous to those already discussed with respect to abrasive article 100 and thus shall not be repeated here.

Figure 5:
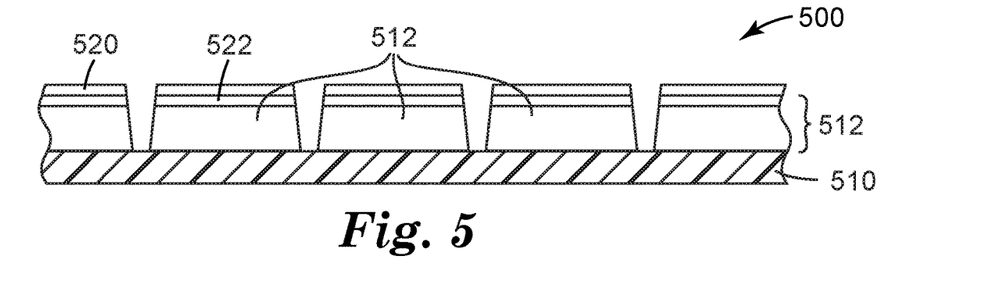

FIG. 5 shows an abrasive article 500 in which an abrasive layer 512 is comprised of discrete islands of an abrasive composite. Such a composite can be made by uniformly mixing abrasive particles with a binder to form a viscous slurry. This slurry can then be cast and appropriately hardened (for example, using a thermal or radiation curing process) onto a backing 510 to afford the abrasive layer 512, as shown in the figure.

In a preferred embodiment, the abrasive slurry is cast between the underlying film and a mold having tiny geometric cavities prior to hardening. After hardening, the resulting abrasive coating is molded into a plurality of tiny, precisely shaped abrasive composite structures affixed to the underlying film. The hardening of the binder can be achieved by a curing reaction triggered by heat or exposure to actinic radiation. Examples of actinic radiation include, for example, an electron beam, ultraviolet light, or visible light.

As shown in FIG. 5, the abrasive layer 512 is coated with a primer layer 520 and supersize coat 522. Particulars of these layers are analogous to those already described with respect to the embodiments of FIGS. 1-4 and will not be repeated.

While not intended to be exhaustive, the provided abrasive articles and related methods are further described according to the various embodiments enumerated below:

1. An abrasive article comprising a plurality of layers in the following order: a backing; an abrasive layer; a primer layer comprising clay particles, wherein the clay particles are agglomerated and form a layer; and a supersize coat comprising a metal salt of a long-chain fatty acid.
2. The abrasive article of embodiment 1, wherein the abrasive layer comprises: a make coat comprising a first polymeric resin, and abrasive particles at least partially embedded in the first polymeric resin; and a size coat disposed on the make coat and comprising a second polymeric resin.
3. The abrasive article of embodiment 1, wherein the abrasive layer comprises a plurality of abrasive composites that are precisely shaped.
4. The abrasive article of embodiment 3, wherein the abrasive composites are molded from an abrasive slurry.
5. The abrasive article of any one of embodiments 1-4, wherein the clay particles comprise a layered silicate.
6. The abrasive article of embodiment 5, wherein the layered silicate comprises a montmorillonite.
7. The abrasive article of embodiment 6, wherein the montmorillonite comprises a sodium montmorillonite.
8. The abrasive article of any one of embodiments 1-7, wherein the clay particles have a median particle size of from 0.01 micrometers to 100 micrometers.
9. The abrasive article of embodiment 8, wherein the clay particles have a median particle size of from 0.02 micrometers to 10 micrometers.
10. The abrasive article of embodiment 9, wherein the clay particles have a median particle size of from 0.1 micrometers to 1 micrometer.
11. The abrasive article of any one of embodiments 1-10, wherein the clay particles have a median aspect ratio of from 10 to 10,000.
12. The abrasive article of embodiment 11, wherein the clay particles have a median aspect ratio of from 20 to 1000.
13. The abrasive article of embodiment 12, wherein the clay particles have a median aspect ratio of from 100 to 1000.
14. The abrasive article of any one of embodiments 1-13, wherein the primer layer further comprises silica nanoparticles.
15. The abrasive article of embodiment 14, wherein the silica nanoparticles comprise sintered silica nanoparticles.
16. The abrasive article of embodiment 14 or 15, wherein the silica nanoparticles have a median particle size of from 1 nanometer to 200 nanometers.
17. The abrasive article of embodiment 16, wherein the silica nanoparticles have a median particle size of from 2 nanometers to 100 nanometers.
18. The abrasive article of embodiment 17, wherein the silica nanoparticles have a median particle size of from 2 nanometers to 30 nanometers.
19. The abrasive article of any one of embodiments 14-18, wherein the silica nanoparticles have a $D_{90}/D_{50}$ particle size ratio of from 1.1 to 5.
20. The abrasive article of embodiment 19, wherein the silica nanoparticles have a $D_{90}/D_{50}$ particle size ratio of from 1.1 to 2.
21. The abrasive article of embodiment 20, wherein the silica nanoparticles have a $D_{90}/D_{50}$ particle size ratio of from 1.4 to 1.8.
22. The abrasive article of any one of embodiments 1-21, wherein the metal salt of a long-chain fatty acid comprises a stearate.
23. The abrasive article of embodiment 22, wherein the stearate comprises calcium stearate, zinc stearate, or a combination thereof.
24. The abrasive article of any one of embodiments 1-23, wherein the primer layer has a coating weight of from 0.01 $g/m^3$ to 10 $g/m^3$.
25. The abrasive article of embodiment 24, wherein the primer layer has a coating weight of from 0.02 $g/m^3$ to 5 $g/m^3$.
26. The abrasive article of embodiment 25, wherein the primer layer has a coating weight of from 0.01 $g/m^3$ to 2 $g/m^3$.
27. The abrasive article of any one of embodiments 1-26, wherein the backing comprises a paper, polymeric film, polymeric foam, or combination thereof.

28. The abrasive article of embodiment 27, wherein the backing comprises a polymeric film and the polymeric film comprises polyurethane rubber.

29. The abrasive article of any one of embodiments 1-28, further comprising an attachment layer coupled to a major surface of the backing opposite the abrasive layer.

30. The abrasive article of embodiment 29, wherein the attachment layer comprises a pressure-sensitive adhesive.

31. The abrasive article of embodiment 29, wherein the attachment layer comprises part of a hook and loop attachment mechanism.

32. The abrasive article of embodiment 29, wherein the attachment layer comprises a plurality of protrusions extending outwardly from the backing, the protrusions comprising a polymer having a Shore A hardness ranging from 5 to 90.

33. A method of making an abrasive article comprising: dispersing clay particles in a first solvent to provide a first dispersion; coating the first dispersion onto an abrasive layer; drying the first dispersion to obtain a primer layer; dispersing a metal salt of a long-chain fatty acid, and optionally a polymeric binder, in a second solvent to provide a second dispersion; coating the second dispersion onto the primer layer; and drying the second dispersion to obtain the abrasive article.

34. The method of embodiment 33, wherein the abrasive layer is disposed on a backing.

35. The method of embodiment 33 or 34, wherein the metal salt of a long-chain fatty acid comprises a stearate.

37. The method of any one of embodiments 33-35, wherein the polymeric binder comprises a carboxy-functional styrene-acrylic resin.

EXAMPLES

Objects and advantages of this disclosure are further illustrated by the following non-limiting examples, but the particular materials and amounts thereof recited in these examples, as well as other conditions and details, should not be construed to unduly limit this disclosure.

The following abbreviations are used to describe the examples:
° C.: degrees Centigrade
cm: centimeter
cm/s: centimeters per second
ctg. wt.: coating weight
g/m$^2$: grams per square meter
in/s: inches per second
Kg: kilogram
KPa: kilopascal
lb: pound
min: minute
mL: milliliter
psi: pounds per square inch
rpm: revolutions per minute
wt %: weight percent Unless stated otherwise, all reagents were obtained or are available from chemical vendors such as Sigma-Aldrich Company, St. Louis, Mo., or may be synthesized by known methods. Unless otherwise reported, all ratios are by weight.

Abbreviations for materials and reagents used in the examples are as follows:
DS-10: Sodium dodecylbenzene sulfonate
SD-1: An aqueous 37.5 wt % calcium stearate/15 wt % styrene acrylic resin soap dispersion, obtained under the trade designation "EC1007A" from eChem Ltd., Leeds, United Kingdom
SD-2: An aqueous calcium stearate soap dispersion, obtained under the trade designation "EC1211" from eChem
SD-3: An aqueous 39-41 wt % zinc stearate soap dispersion, obtained under the trade designation "EC1696" from eChem
SD-4: An aqueous 40.9 wt % zinc stearate soap dispersion, obtained under the trade designation "EC994C" from eChem
SD-5: An aqueous 40.9 wt % zinc stearate/8 wt % styrene acrylic soap dispersion
MMC: A natural montmorillonite clay obtained under the trade designation "CLOISITE-Na+" from BYK-Chemie GmbH, Wesel, Germany
N1115: A 16.5 wt % aqueous 4 nm colloidal spherical silica dispersion, commercially available under the trade designation "NALCO 1115" from NALCO Chemical Company, Naperville, Ill.
NaHMP: Sodium hexametaphosphate Clay Dispersions

CD-1

1.5 parts MMC was added to 98.5 parts deionized water at 21° C. in a container and rolled for 48 hours until homogeneously dispersed using a bench top roller, obtained from Wheaton Industries, Inc. N1115 was then added to the clay dispersion, in a ratio of 1:3.6 parts by weight N1115:clay dispersion, and rolling continued for another 2 hours. 1.0 Molar nitric acid was added dropwise until a pH of 2.0 was attained. The ratio of N1115:MMC was 75:25 by weight of solids, and the total solids content of the dispersion was 4.7 wt %.

CD-2

3.7 parts MMC was homogeneously dispersed in 96.25 parts deionized water and 0.05 parts DS-10 by rolling for 48 hours at 21° C. Total solids content was 3.7 wt %.

CD-3

3.7 parts MMC was homogeneously dispersed in 96.3 parts deionized water by rolling for 48 hours at 21° C. To this was added N1115 in the ratio 1:1.4 parts by weight N1115:3.7% MMC dispersion, and rolling continued for another 2 hours. The ratio of N1115:MMC was 75:25 by weight of solids, and the total solids content of the dispersion was 8.8 wt %.

CD-4

3.5 parts MMC was homogeneously dispersed with 96.5 parts deionized water at 21° C. by rolling for 48 hours. 0.0015 parts DS-10 and 1 part N1115 dispersion were then added to the clay dispersion and rolling continued for 2 hours. The ratio of N1115:MMC was 25:75 by weight of solids, and the total solids content of the dispersion was 4.4 wt %.

CD-5

3.7 parts MMC was homogeneously dispersed in 96.3 parts deionized water by rolling for 48 hours at 21° C. To this was added N1115 in the ratio 1:13.9 parts by weight N1115:3.7% MMC dispersion, and rolling continued for another 2 hours. The ratio of N1115:MMC was 25:75 by weight of solids, and the total solids content of the dispersion was 4.6 wt %.

CD-6

A clay/silica dispersion was prepared as generally described for CD-3, wherein the pH was reduced to 2.0 by the dropwise addition of 1.0 Molar nitric acid. The ratio of N1115:MMC was 75:25 by weight of solids, and the total solids content of the dispersion was 8.8 wt %.

CD-7

3.5 parts MMC was homogeneously dispersed in 96.5 parts deionized water by rolling for 48 hours at 21° C. Total solids content was 3.5 wt %.

CD-8

MMC was homogeneously dispersed in deionized water and NaHMP by rolling for 48 hours at 21° C. Total solids content was 9.6 wt %.

CD-9

A clay dispersion was prepared as generally described for CD-5, wherein the amount of MMC was increased to provide a N1115:MMC ratio of 22:78 parts by weight and a total solids content of 6.1 wt %.

A summary of the clay dispersions is provide in Table 1.

TABLE 1

| Clay Dispersion | N1115:MMC (by wt.) | pH | Total Solids (wt %) | DS-10 (wt %) | NaHMP |
|---|---|---|---|---|---|
| CD-1 | 75:25 | 2.0 | 4.7 | 0 | 0 |
| CD-2 | Not Applicable | 9.7 | 3.7 | 0.05 | 0 |
| CD-3 | 75:25 | 10.8 | 8.8 | 0 | 0 |
| CD-4 | 25:75 | 10.3 | 4.4 | 0.15 | 0 |
| CD-5 | 25:75 | 2.0 | 4.6 | 0 | 0 |
| CD-6 | 75:25 | 2.0 | 8.8 | 0 | 0 |
| CD-7 | Not Applicable | 9.7 | 3.5 | 0 | 0 |
| CD-8 | Not Applicable | n/a | 9.6 | 0 | 0.6 |
| CD-9 | 22:78 | 2.0 | 6.1 | 0 | 0 |

Examples

The following commercially available coated abrasives, obtained from 3M Company, St. Paul, Minn., were manufactured without the stearate supersize and are identified as the following experimental coated abrasive substrates:

EX-P180: A grade P180 coated abrasive obtained under the trade designation "236U P180".
EX-P320: A grade P320 coated abrasive obtained under the trade designation "216U P320".
EX-P400: A grade P400 coated abrasive obtained under the trade designation "325U P400".
EX-P500: A grade P500 coated abrasive obtained under the trade designation "255P P500".
EX-P800: A grade P800 coated abrasive obtained under the trade designation "270J P800".

It is to be understood that, to one of ordinary skill in the art, the stearate supersize on a commercially available coated abrasive sheet could be removed merely by gently brushing off said supersize using a dilute aqueous soap solution. The abrasive materials were in roll form, or converted to 8 inch by 12 inch (20.32 cm by 30.48 cm) sheets, and coated with a clay dispersion, then with a stearate supersize, by one of the following methods.

Knife Coating

A laboratory knife coater was set to a gap height of 0.08 mm using a feeler gauge. Approximately 5 mL of the prepared clay dispersion was applied to the 8 by 12 inch (20.32 by 30.48 cm) abrasive sheet by means of a pipette and the sheet then pulled through the coater, after which it was dried at 120° C. for 10 minutes. The stearate supersize was than applied over the dried clay dispersion in a similar fashion, after which the abrasive sheet was dried at 100° C. for 5 minutes.

Spray Coating

A spray gun, model "ACCUSPRAY HG14", obtained from 3M Company, mounted on a robotic arm at a distance of 12 inches (30.48 cm) from the abrasive sheet, was used to uniformly apply either the clay dispersion and/or the stearate supersize over the abrasive surface at an inline pressure of 20 psi (137.9 kPa). As identified in the Examples, the stearate supersize was applied "wet over wet" or "wet over dry" with respect to the clay dispersion. Spray coated applications were dried by means of a heat gun.

Roll Coating

Clay dispersions and stearate supersize compositions were applied to 12 inch (30.48 cm) wide experimental coated abrasive substrate by means of a calendar roll coater. Clay dispersions were dried at 95° C. for 10 minutes.

Evaluations

Loop attachment material was then laminated to the backside of the coated abrasive material and converted into either 6 inch (15.24 cm) diameter or 150 mm diameter discs.

Cut Test 1

Abrasive performance testing was performed on an 18 inches by 24 inches (45.7 cm by 61 cm) black painted cold roll steel test panels having "NEXA OEM" type clearcoat, obtained from ACT Laboratories, Inc., Hillsdale, Mich. Sanding was performed using a random orbit sander, model "ELITE RANDOM ORBITAL SANDER", from 3M Company, operating at a line pressure of 90 psi (620.5 KPa) and 5/16 inch (7.94 mm) stroke for P320 grade samples, or a line pressure of 40 psi (275.8 KPa) and 3/16 inch (4.76 mm) stroke for P800 grade samples. For testing purposes, the abrasive discs were attached to a 6 inch (15.2 cm) interface pad, which was then attached to a 6 inch (15.2 cm) backup pad, both commercially available under the trade designations "HOOKIT INTERFACE PAD, PART NO. 05777" and "HOOKIT BACKUP PAD, PART NO. 05551," from 3M Company. The interface pad was not used for P320 testing. Each abrasive disc was tested for 2 minutes, in 1-minute intervals. The test panel was weighed before and after sanding, and where the difference in mass is the measured cut, reported as grams per interval. Two abrasive discs were tested per each Comparative and Example.

Cut Test 2

A 6 inch (15.24 cm) diameter abrasive disc was mounted on a 6 inch (15.24 cm) diameter, 25-hole backup pad, part no. 05865, obtained from 3M Company. This assembly was then attached to a dual action axis of a servo controlled motor, disposed over an X-Y table, with the "Nexa OEM" clearcoated cold roll steel test panel secured to the table. The servo controlled motor was run at 7200 rpm, and the abrasive article urged at an angle of 2.5 degrees against the panel at a load of 13 lbs (5.90 Kg). The tool was then set to traverse at a rate of 20 in/s (50.8 cm/s) along the width of the panel and a traverse along the length of the panel at a rate of 5 in/s (12.7 cm/s). Seven such passes along the length of the panel were completed in each cycle for a total of 3 cycles, for a total of 3 minutes sanding time. The mass of the panel was measured before and after each cycle to determine the total mass lost in grams for each cycle, as well as a cumulative mass loss at the end of 3 cycles. Two abrasive discs were tested per each Comparative and Example.

Cut Test 3

A sample coated disc, converted to 150 mm diameter discs with 15 dust extraction holes, was aligned with a corresponding 15-hole back up pad, part no. 20465, and attached to a 150 mm/5 mm orbit, model "ELITE RANDOM ORBITAL SANDER", both obtained from 3M Company. Replicate cut tests, between 3 and 6 discs per sample, measured the weight of paint removal from a 500 mm by 500 mm metal panel coated with a grey Standox primer filler paint, type U7540. Sanding time was four minutes, at an evenly distributed down force of 5.5 lbs (2.5 Kg) and zero sanding angle, across the same painted surface path in each test.

Example 1 and Comparative A

Clay Dispersion CD-1 was knife coated over an EX-P400 abrasive sheet, dried, knife coated with SD-2, then dried again. Comparative A was prepared in a similar manner as Example 1, but without the clay dispersion coating. The dry coated weights for the clay dispersions and stearate layers were 1 g/m$^2$ and 10 g/m$^2$, respectively. Evaluations according to Cut Test 3 are listed in Table 2.

TABLE 2

| Sample | Total Cut (grams) |
| --- | --- |
| Example 1 | 8.97 |
| Comparative A | 7.40 |

Examples 2-8 and Comparatives B and C

Clay Dispersions CD-2, CD-3 and CD-4 were knife coated onto abrasive substrate EX-P320; CD-2, CD-4, CD-5 and CD-6 were knife coated onto abrasive substrate EX-P800. Samples were dried, after which they were spray coated with zinc stearate SD-4, then dried as described previously. Comparative B was prepared in a similar manner as Examples 2-4, but without the clay dispersion coating. Likewise, Comparative C was prepared in a similar manner as Examples 5-8, but without the clay dispersion coating. The dry coated weights for the clay dispersions and stearate layers were 1 g/m$^2$ and 10 g/m$^2$, respectively. Evaluations according to Cut Test 1 are listed in Table 3.

TABLE 3

| Sample | Abrasive Substrate | Clay Dispersion | Stearate Dispersion | Cut Test 1 (grams) 1$^{st}$ Minute | 2$^{nd}$ Minute | Total |
| --- | --- | --- | --- | --- | --- | --- |
| Example 2 | EX-P320 | CD-2 | SD-4 | 4.92 | 3.59 | 8.51 |
| Example 3 | EX-P320 | CD-3 | SD-4 | 5.02 | 3.88 | 8.90 |
| Example 4 | EX-P320 | CD-4 | SD-4 | 5.97 | 4.34 | 10.13 |
| Comparative B | EX-P320 | None | SD-4 | 5.43 | 3.36 | 8.79 |
| Example 5 | EX-P800 | CD-2 | SD-4 | 0.66 | 0.36 | 1.02 |
| Example 6 | EX-P800 | CD-4 | SD-4 | 0.65 | 0.25 | 0.90 |
| Example 7 | EX-P800 | CD-5 | SD-4 | 0.56 | 0.31 | 0.87 |
| Example 8 | EX-P800 | CD-6 | SD-4 | 0.69 | 0.27 | 0.96 |
| Comparative C | EX-P800 | None | SD-4 | 0.58 | 0.24 | 0.82 |

Examples 9-12 and Comparatives D and E

Clay Dispersions CD-2 and CD-7 were spray coated onto abrasive substrate EX-P800, dried, then spray coated with either SD-3 or SD-4. Comparatives D and E correspond to Examples 9-10 and 11-12, but without the clay dispersion coating, respectively. The dry coated weights for the clay dispersions and stearate layers were 0.9 g/m$^2$ and 10 g/m$^2$, respectively. Evaluations according to Cut Test 1 are listed in Table 4.

TABLE 4

| Sample | Abrasive Substrate | Clay Dispersion | Stearate Dispersion | Total Cut @ 2 min. (Cut Test 1, grams) |
| --- | --- | --- | --- | --- |
| Example 9 | EX-P800 | CD-2 | SD-4 | 0.82 |
| Example 10 | EX-P800 | CD-7 | SD-4 | 0.89 |
| Comparative D | EX-P800 | None | SD-4 | 0.82 |
| Example 11 | EX-P800 | CD-2 | SD-3 | 0.91 |
| Example 12 | EX-P800 | CD-7 | SD-3 | 0.96 |
| Comparative E | EX-P800 | None | SD-3 | 0.94 |

Examples 13-24 and Comparatives F and G

Clay Dispersion CD-7 was spray coated onto abrasive substrates EX-P180 and EX-P320 over a range of coating weights. In some instances, the clay dispersion was dried, in others the dispersion remained wet, before spray coating with stearate dispersion SD-5. Comparatives F and G correspond to Examples 13-18 and 19-24, but without the clay dispersion coating, respectively. The dry coated weight for the stearate layer was 10 g/m$^2$. Evaluations according to Cut Test 2 are listed in Table 5.

TABLE 5

| Sample | Abrasive Substrate | Clay Dispersion | CD Dry Ctg.Wt. (g/m$^2$) | Stearate On CD Coating Regimen | Stearate Dispersion | Total Cut (Cut Test 2, grams) |
| --- | --- | --- | --- | --- | --- | --- |
| Example 13 | EX-P320 | CD-7 | 0.9 | Wet on Dry | SD-5 | 7.6 |
| Example 14 | EX-P320 | CD-7 | 0.9 | Wet on Wet | SD-5 | 7.5 |
| Example 15 | EX-P320 | CD-7 | 1.8 | Wet on Dry | SD-5 | 7.5 |
| Example 16 | EX-P320 | CD-7 | 1.8 | Wet on Wet | SD-5 | 7.6 |
| Example 17 | EX-P320 | CD-7 | 2.4 | Wet on Dry | SD-5 | 8.0 |
| Example 18 | EX-P320 | CD-7 | 2.4 | Wet on Wet | SD-5 | 8.0 |
| Comparative F | EX-P320 | None | 0 | Not Applicable | SD-5 | 7.0 |
| Example 19 | EX-P180 | CD-7 | 0.9 | Wet on Dry | SD-5 | 10.5 |
| Example 20 | EX-P180 | CD-7 | 0.9 | Wet on Wet | SD-5 | 10.2 |
| Example 21 | EX-P180 | CD-7 | 1.8 | Wet on Dry | SD-5 | 10.5 |
| Example 22 | EX-P180 | CD-7 | 1.8 | Wet on Wet | SD-5 | 10.5 |

TABLE 5-continued

| Sample | Abrasive Substrate | Clay Dispersion | CD Dry Ctg.Wt. (g/m²) | Stearate On CD Coating Regimen | Stearate Dispersion | Total Cut (Cut Test 2, grams) |
|---|---|---|---|---|---|---|
| Example 23 | EX-P180 | CD-7 | 2.4 | Wet on Dry | SD-5 | 10.2 |
| Example 24 | EX-P180 | CD-7 | 2.4 | Wet on Wet | SD-5 | 9.7 |
| Comparative G | EX-P180 | None | 0 | Not Applicable | SD-5 | 10.1 |

Examples 25-30 and Comparatives H and I

Clay Dispersion CD-7 was spray coated onto abrasive substrate EX-P800, in a range of coating weights, and dried, then spray coated with either SD-3 or SD-4 stearate dispersions. Comparatives H and I correspond to Examples 25-27 and 28-30 without the clay dispersion coating, respectively. The dry coated weight for the stearate layer was 10 g/m². Evaluations according to Cut Test 1 are listed in Table 6.

TABLE 6

| Sample | Abrasive Substrate | Clay Dispersion | CD Dry Ctg. Wt. (g/m²) | Stearate Dispersion | Total Cut @ 2 min. (Cut Test 1, grams) |
|---|---|---|---|---|---|
| Example 25 | EX-P800 | CD-7 | 0.9 | SD-4 | 0.85 |
| Example 26 | EX-P800 | CD-7 | 1.8 | SD-4 | 0.68 |
| Example 27 | EX-P800 | CD-7 | 2.4 | SD-4 | 1.00 |
| Comparative H | EX-P800 | None | 0 | SD-4 | 0.70 |
| Example 28 | EX-P800 | CD-7 | 0.9 | SD-3 | 1.25 |
| Example 29 | EX-P800 | CD-7 | 1.8 | SD-3 | 1.00 |
| Example 30 | EX-P800 | CD-7 | 2.4 | SD-3 | 1.00 |
| Comparative I | EX-P800 | None | 0 | SD-3 | 1.14 |

Examples 31-33 and Comparative J

Clay Dispersions CD-1, CD-8 and CD-9 were roll coated onto abrasive substrate EX-P500 and dried, then roll coated with stearate dispersion SD-1. Comparative J corresponds to Examples 28-30, but without the clay dispersion coating. Evaluations according to Cut Test 3 are listed in Table 7.

TABLE 7

| Sample | Abrasive Substrate | Clay Dispersion Type | Clay Dispersion Dry Ctg. Wt. (g/m²) | Stearate Type | Stearate Dry Ctg. Wt (g/m²) | Total Cut @ 4 min (Cut Test 3, in g) |
|---|---|---|---|---|---|---|
| Example 31 | EX-P500 | CD-9 | 2.8 | SD-1 | 9.0 | 6.57 |
| Example 32 | EX-P500 | CD-8 | 2.11 | SD-1 | 9.0 | 6.56 |
| Example 33 | EX-P500 | CD-1 | 0.79 | SD-1 | 12.5 | 6.33 |
| Comparative J | EX-P500 | None | 0 | SD-1 | 11.0 | 5.97 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive article comprising a plurality of layers in the following order:
   a backing;
   an abrasive layer;
   a primer layer comprising clay particles, wherein the clay particles are agglomerated and form a layer; and
   a supersize coat comprising a metal salt of a long-chain fatty acid.

2. The abrasive article of claim 1, wherein the abrasive layer comprises:
   a make coat comprising a first polymeric resin, and abrasive particles at least partially embedded in the first polymeric resin; and
   a size coat disposed on the make coat and comprising a second polymeric resin.

3. The abrasive article of claim 1, wherein the abrasive layer comprises a plurality of abrasive composites that are precisely shaped.

4. The abrasive article of claim 1, wherein the clay particles comprise a layered silicate.

5. The abrasive article of claim 1, wherein the clay particles have a median particle size of from 0.01 micrometers to 100 micrometers.

6. The abrasive article of claim 1, wherein the clay particles have a median aspect ratio of from 10 to 10,000.

7. The abrasive article of claim 1, wherein the primer layer further comprises silica nanoparticles.

8. The abrasive article of claim 7, wherein the silica nanoparticles have a median particle size of from 1 nanometer to 200 nanometers.

9. The abrasive article of claim 7, wherein the silica nanoparticles have a $D_{90}/D_{50}$ particle size ratio of from 1.1 to 5.

10. The abrasive article of claim 1, wherein the metal salt of a long-chain fatty acid comprises a stearate and wherein the stearate comprises calcium stearate, zinc stearate, or a combination thereof.

11. The abrasive article of claim 1, wherein the primer layer has a coating weight of from 0.01 g/m³ to 10 g/m³.

12. The abrasive article of claim 1, wherein the backing comprises a paper, polymeric film, polymeric foam, or combination thereof.

* * * * *

UNITED STATES PATENT AND TRADEMARK OFFICE
CERTIFICATE OF CORRECTION

PATENT NO.         : 10,688,625 B2                                    Page 1 of 1
APPLICATION NO.    : 16/066493
DATED              : June 23, 2020
INVENTOR(S)        : Adam Meuler et al.

It is certified that error appears in the above-identified patent and that said Letters Patent is hereby corrected as shown below:

In the Specification

Column 6
Lines 14-21, delete "The top layer of the abrasive article 100 is the supersize coat 122, which extends over and contacts the primer layer 120. As the outermost coating, this layer directly contacts the workpiece during an abrading operation. Together, the supersize coat 122 and primer layer 120 act to reduce the loading of swarf around the abrasive particles 114 and improve the overall cut performance of the abrasive article 100." and insert the same on Column 6, Line 15 as a new paragraph.
Lines 29-38, delete "The supersize coat 122 can be formed, in some embodiments, by providing a supersize dispersion that includes an epoxy resin, emulsifier for the epoxy resin, curing agent, and solvent, such as water. The composition may further include a polymeric binder, such as a carboxy-functional styrene-acrylic resin. Once mixed, the supersize dispersion can be coated onto the underlying layers of the abrasive article 100 and cured (i.e., hardened) either thermally or by exposure to actinic radiation at suitable wavelengths to activate the curing agent." and insert the same on Column 6, Line 30 as a new paragraph.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*